(12) United States Patent
Reeves et al.

(10) Patent No.: US 11,991,045 B1
(45) Date of Patent: May 21, 2024

(54) MANAGING NETWORK CONFIGURATIONS

(71) Applicant: T-MOBILE INNOVATIONS LLC, Overland Park, KS (US)

(72) Inventors: Raymond Emilio Reeves, Orlando, FL (US); Jason Peter Sigg, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/204,126

(22) Filed: May 31, 2023

(51) Int. Cl.
*G06F 15/177* (2006.01)
*H04L 41/08* (2022.01)
*H04L 41/0816* (2022.01)
*H04L 41/0894* (2022.01)

(52) U.S. Cl.
CPC ...... *H04L 41/0894* (2022.05); *H04L 41/0816* (2013.01); *H04L 41/0886* (2013.01)

(58) Field of Classification Search
CPC ............. H04L 41/0894; H04L 41/0816; H04L 41/0886
See application file for complete search history.

(56) References Cited

U.S. PATENT DOCUMENTS

| | | | | |
|---|---|---|---|---|
| 11,375,526 | B1* | 6/2022 | Sevindik | H04W 72/04 |
| 2004/0095907 | A1* | 5/2004 | Agee | H04B 7/10 |
| | | | | 370/400 |
| 2011/0122854 | A1* | 5/2011 | De Lind Van Wijngaarden | H04L 47/41 |
| | | | | 370/469 |
| 2020/0396623 | A1* | 12/2020 | Kakinada | H04L 41/0654 |
| 2021/0105617 | A1* | 4/2021 | Mo | H04W 76/11 |
| 2022/0131747 | A1* | 4/2022 | Sevindik | H04L 1/08 |
| 2022/0141844 | A1* | 5/2022 | Sevindik | H04L 61/5007 |
| | | | | 370/329 |
| 2022/0377565 | A1* | 11/2022 | Sevindik | H04W 4/24 |
| 2023/0012713 | A1* | 1/2023 | Khalid | H04W 72/0453 |
| 2023/0020832 | A1* | 1/2023 | Hotchkiss | H04L 41/12 |
| 2023/0025898 | A1* | 1/2023 | Kaplan | H04W 16/18 |

FOREIGN PATENT DOCUMENTS

| | | | | | |
|---|---|---|---|---|---|
| GB | 2332820 | A | * | 6/1999 | ............ H04W 84/14 |
| GB | 2377117 | A | * | 12/2002 | ......... H04L 12/5602 |
| WO | WO-2018065764 | A1 | * | 4/2018 | .......... H04L 41/022 |
| WO | WO-2023076788 | A1 | * | 5/2023 | ........ H04W 28/0252 |

* cited by examiner

*Primary Examiner* — Richard G Keehn
(74) *Attorney, Agent, or Firm* — Shook, Hardy & Bacon L.L.P.

(57) ABSTRACT

Systems and methods are provided for managing network configurations. In aspects, fixed wireless access-capable devices can be identified by a network manager to aggregate network connections. This may be utilized to manage congestion at a network node such that multiple direct connections with the network node are aggregated into fewer direct connections with the network node, using a fixed wireless access-capable device as an intermediary.

20 Claims, 7 Drawing Sheets

MANAGING NETWORK CONFIGURATIONS

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for managing network connections. More particularly, in aspects set forth herein, systems and methods enable providing service to multiple devices via few connections (e.g., each device is not directly connected to a network). A reality in today's networking environment is that limited resources cannot indefinitely yield excellent user experience and network performance. The invention described herein leverages real-time visibility into network and user equipment (UE) behavior to dynamically balance the need to effectively manage resource utilization and subscriber experience by determining an optimal network configuration at different points in time according to UE capabilities, UE performance, service constraints, agreements, etc.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
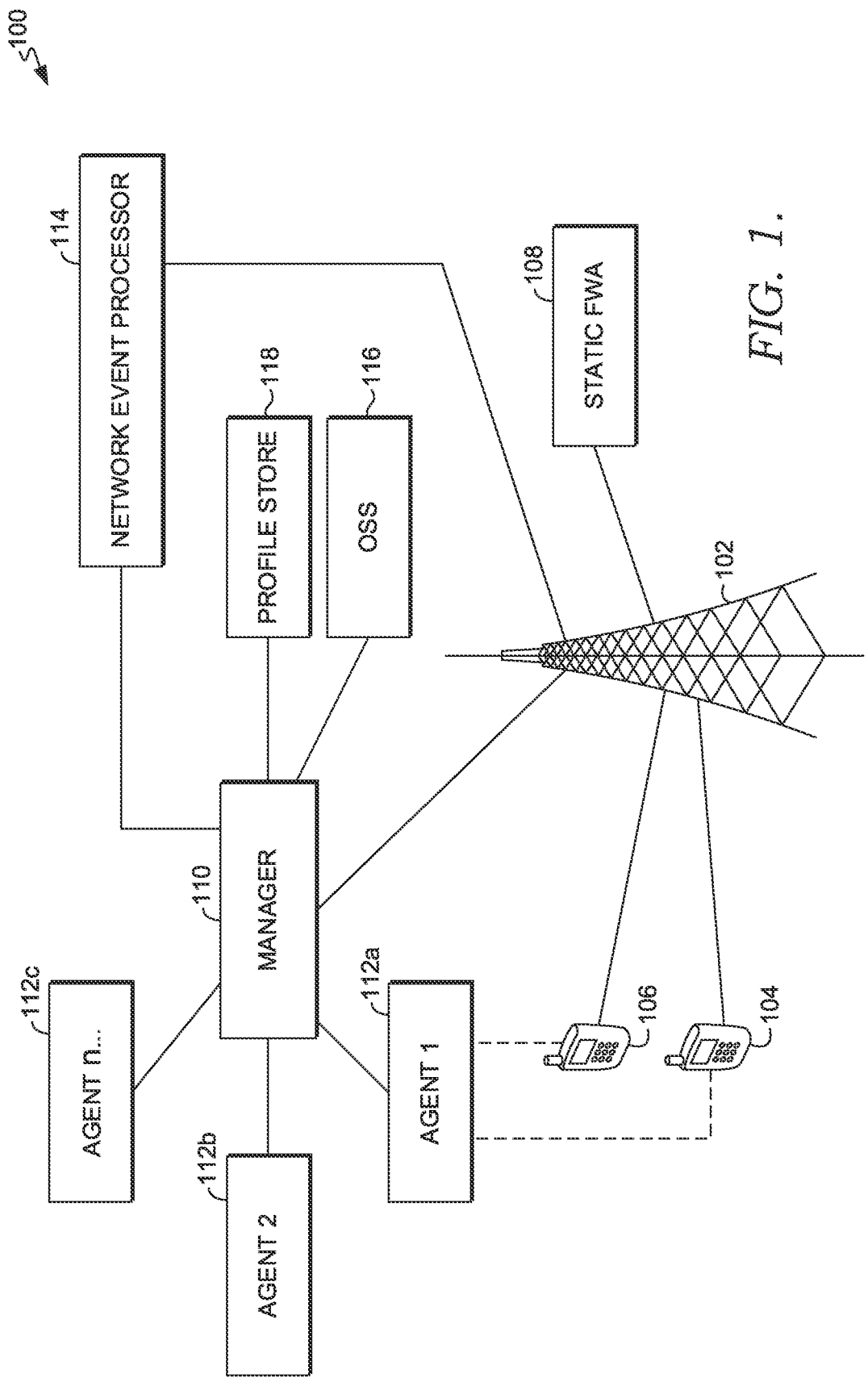
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AMF Access & Mobility Management Function
APN Access Point Name
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCF Policy Control Function
PCS Personal Communications Service
PDA Personal Digital Assistant
RAM Random Access Memory
RET Remote Electrical Tilt
RF Radio-Frequency
RFI Radio-Frequency Interference
R/N Relay Node
ROM Read Only Memory
SINR Transmission-to-Interference-Plus-Noise Ratio
SMF Session Management Function
SNR Transmission-to-noise ratio
SON Self-Organizing Networks
TDMA Time Division Multiple Access
TXRU Transceiver (or Transceiver Unit)
UDM Unified Data Management Function
UDR Unified Data Repository
UE User Equipment
UPF User Plane Function Further, various technical terms are used throughout this description. An illustrative resource that fleshes out various aspects of these terms can be found in Newton's Telecom Dictionary, 32d Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In conventional cellular communications technology, a 5G telecommunications network comprises a 5G Core Network (5GC) and a gNodeB (gNB). The 5GC architecture, as known to those in the art, relies on a Service-Based Architecture (SBA) framework where the architecture elements are defined in terms of Network Functions (NF) rather than by traditional network entities. Using interfaces of a common framework, any NF can offer its services to other NFs that are permitted to make use of their functions. At times, the network interfaces can experience complete failures, degradations, and the like. This compromises the ability of other NFs to obtain necessary data to establish reliable sessions for UEs.

The present disclosure is directed to managing network configurations. Recent trends show a dramatic rise in fixed wireless access (FWA) home internet (HINT) subscribers with reason to believe the numbers will continue to grow exponentially. With this anticipated increase in demand on telecommunications networks, concerns regarding network capacity and performance under this sort of load are also on the rise. Some are concerned that performance will decrease while others have voiced concerns that network providers may reduce speeds for some customers to minimize network congestion caused by the increased number of dedicated, always-on FWA HINT devices. While many of the concerns are unfounded, the reality is that limited resources cannot indefinitely yield excellent user experiences and network performance. In fact, specific network constraints exist, such as limits on a maximum number of UEs per cell, connection counts, tonnage volume, coverage area beamwidth, etc., that will impact performance in these situations. There is a growing need to improve usage of existing network resources to minimize the cost of expansion and rising utilization levels.

With that in mind, network providers can leverage their real-time visibility into network and UE behavior through the core network (e.g., 5GC) and radio access network (RAN) interactions in the form of protocol messages at the network and applications levels to create a contextual network aggregate concentrator (CoNAtion) architecture targeting both network and UE components that would dynamically balance the need to effectively manage resource utilization and subscriber experience, which through the deployment of a centralized manager and distributed agents would leverage predictive analytics to determine the best HINT and UE configurations at every point in time and space according to UE capabilities, UE performance, service constraints, user agreement/preferences, business agreements, and the like. In practical terms, this also means that today's 5G HINT devices used for dedicated FWA concentration would be such much like any other CoNAtion-aware UE with onboard agents that may be an on-demand FWA concentrator. Driven by intelligent analysis of the past, present, and predicted context, the manager can determine CoNAtion-roles with transient configuration relative to both the UEs and involved network components.

Accordingly, a first aspect of the present disclosure is directed to a system for managing network configurations. The system comprises one or more processors that are configured to receive an indication that a network node is at a maximum traffic threshold; determine whether at least one fixed wireless access (FWA)-capable device is connected to the network node; upon determining there is a FWA-capable device connected to the network node, assign the FWA-capable device as a FWA hub, wherein the FWA hub acts as an intermediate device between the network node any one or more devices; and connect the one or more devices to the network node via the FWA hub.

A second aspect of the present disclosure is directed to a method for managing network configurations. The method comprises receiving an indication that a network node is at a maximum traffic threshold; determining whether at least one fixed wireless access (FWA)-capable device is connected to the network node; upon determining there is a FWA-capable device connected to the network node, assigning the FWA-capable device as a FWA hub, wherein the FWA hub acts as an intermediate device between the network node any one or more devices; and connecting the one or more devices to the network node via the FWA hub.

Another aspect of the present disclosure is directed to a method for managing network configurations. The method comprises identifying a network node at a maximum traffic threshold, wherein the network node is managing a first connection with a fixed wireless access (FWA)-capable device, a second connection with a non-FWA-capable device, and a third connection with a non-FWA-capable device; assigning the FWA-capable device as a FWA hub; and aggregating the second and third connections by transferring each to the FWA hub such that the second and third connections connect indirectly to the network node via the FWA hub, wherein the network node maintains a first connection with the FWA hub, and wherein the second and third connections were terminated from a direct connection with the network node.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 6:
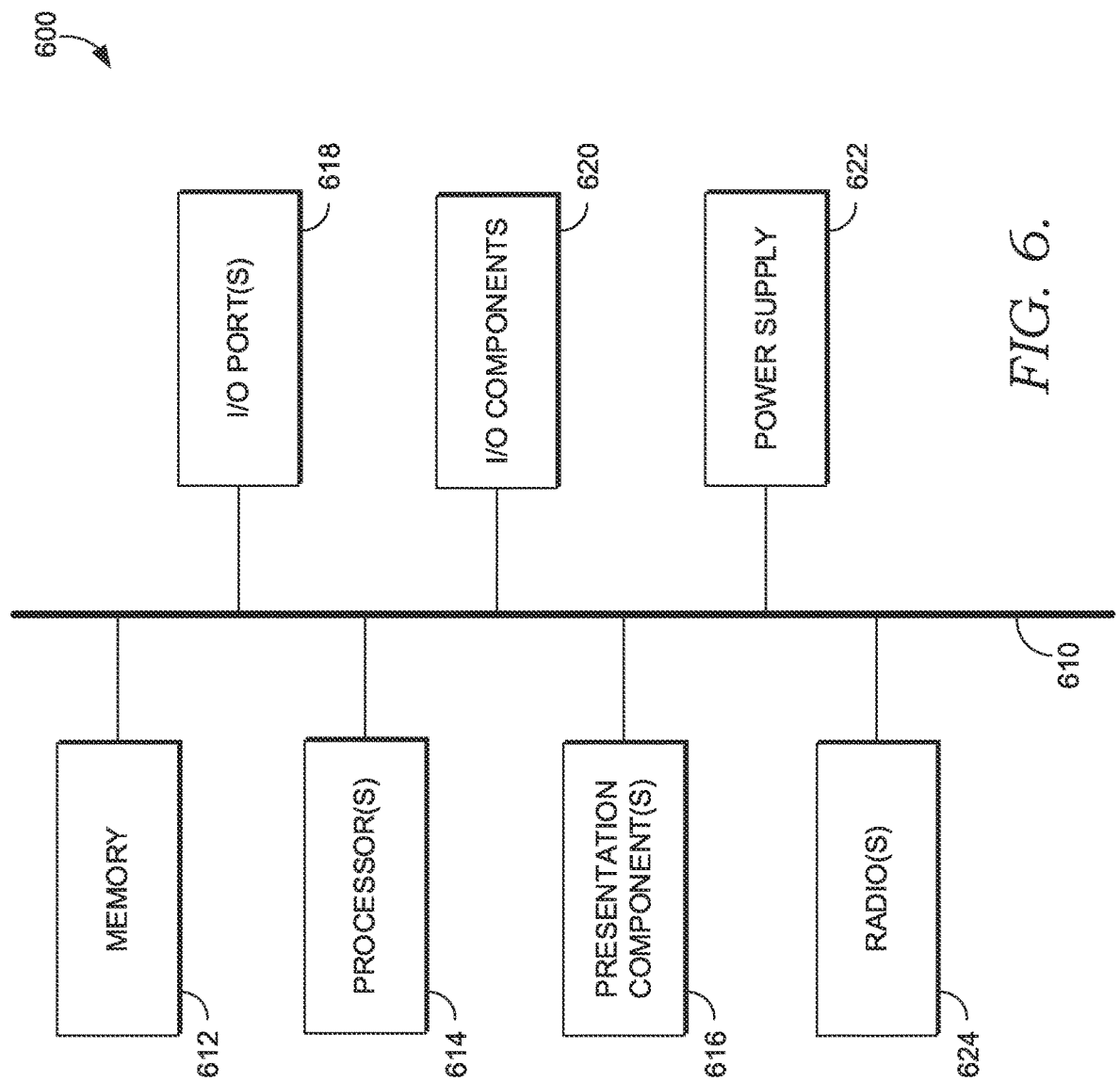
FIG. 6 depicts a diagram of an exemplary computing environment suitable for use in implementations of the present disclosure, in accordance with aspects herein.

A network cell may comprise a base station 102 to facilitate wireless communication between a communications device within the network cell, such as communications device 600 described with respect to FIG. 6, and a network. As shown in FIG. 1, communications device may be UE 104 and UE 106. In the network environment 100, UE 104, 106 may communicate with other devices, such as mobile devices, servers, etc. The UE 104, 106 may take on a variety of forms, such as a personal computer, a laptop computer, a tablet, a netbook, a mobile phone, a Smart phone, a personal digital assistant, or any other device capable of communicating with other devices. For example, the UE 104, 106 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 104, 106 can be any mobile computing device that communicates by way of, for example, a 5G network.

The UE 104, 106 may utilize a network to communicate with other computing devices (e.g., mobile device(s), a server(s), a personal computer(s), etc.). In embodiments, the network is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. The network may include multiple networks. The network may be part of a telecommunications network that connects subscribers to their immediate service provider. In embodiments, network is associated with a telecommunications provider that provides services to user devices, such as UE 104, 106. For example, the network may provide voice services to user devices or corresponding users that are registered or subscribed to utilize the services provided by a telecommunications provider.

FIG. 1 illustrates a static FWA 108 connected to the base station 102 via a telecommunications network. In embodiments, the base station 102 is a RAN node (e.g., 5G gNB) and the static FWA 108 is a FWA 5G HINT device. As is illustrated in FIG. 1, the static FWA 108 has a direct connection with the RAN node. Multiple other devices (e.g., TVs, mobile devices, tablets, desktop computers, etc.) can connect to the static FWA 108 for access to the network. The additional other devices connected to the static FWA 108 do not have direct connections with the RAN node such that the static FWA 108 and any device connected therewith only amounts to a single connection with the RAN node. Similarly, FIG. 1 also illustrates each of UEs 104 and 106 having a direct connection with the node 102. This is exemplary in nature and is not meant to limit the scope of the invention. UEs 104 and 106 could be connected to the node 102 via the static FWA 108 or any other FWA-capable device. As used herein, an FWA-capable device refers generally to any device (static or mobile) that has the ability to serve as a FWA to a node. Put simply, a FWA-capable device can facilitate a direct connection to a RAN node for itself while also facilitating access to the RAN node to one or more other devices that are not directly connected to the RAN node themselves.

FIG. 1 also includes a network event processor 114. The network event processor 114 is in communication with the node 102 regarding any network events. The node 102 is configured to share network events (new nodes entering the network, nodes leaving the network, UEs connected to the network, UEs leaving the network, etc.) with the network event processor 114. In aspects, the network event processor 114 can be configured to communicate with a CoNAtion manager, shown as manager 110. The manager 110 can be a centralized manager or distributed manager. The manager 110 is aware of all connected nodes, any network constraints (e.g., a maximum number of connections, maximum traffic load, a maximum number of UEs registered, etc.), UE information for any UE connected to the network (e.g., which UEs are CoNAtion-aware), network information, and the like. The manager 110 obtains network information from Operational Support Systems (OSS) 116 and UE and/or user information from one or more databases, shown as profile store 118.

The manager 110 is also in communication with one or more agents shown as Agent 112a, Agent 112b, and Agent 112c. The agents are configured to carry out instructions communicated from the manager 110. In aspects, the one or more agents can run on a user device as integrated software. As shown, Agents 112a, 112b, and 112c can communicated with UE 104 and UE 106.

Figure 2B:
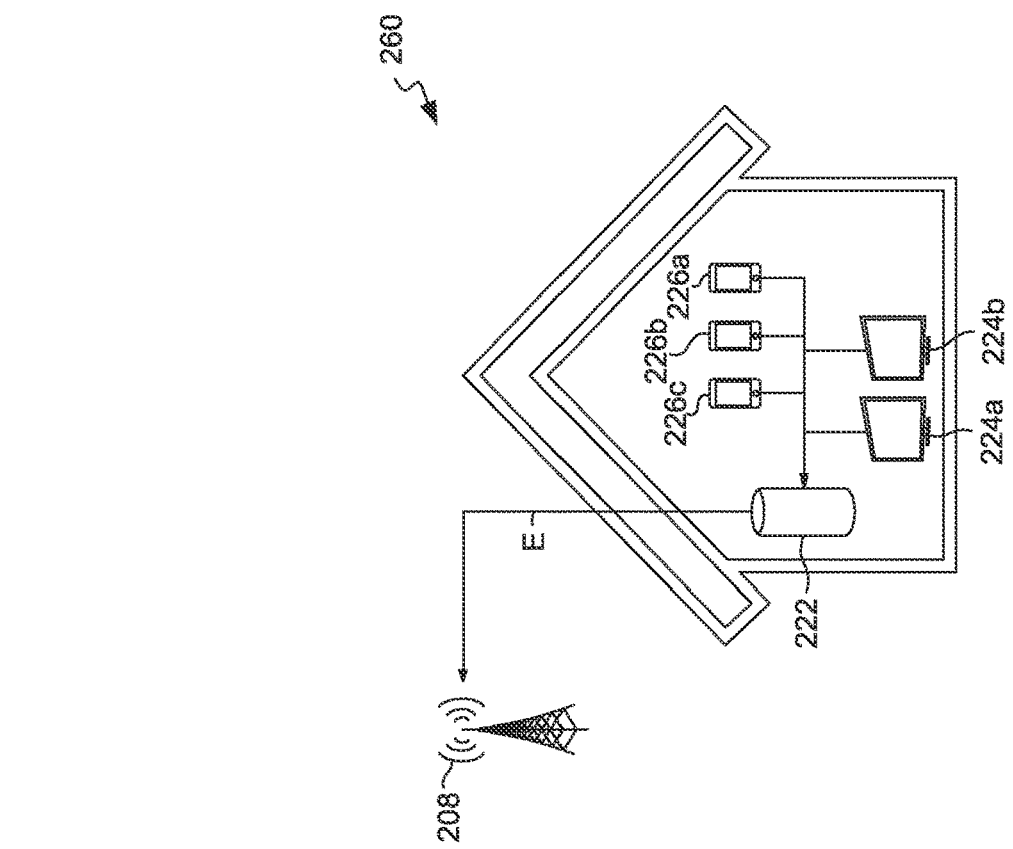
FIGS. 2a and 2b depict exemplary network environments in which implementations of the present disclosure may be employed, in accordance with aspects herein.
Figure 2A:
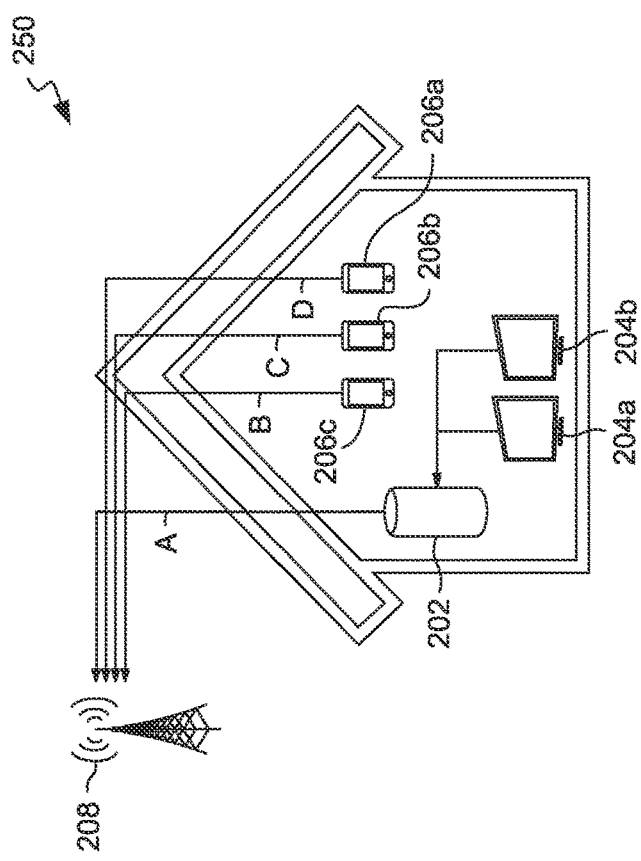

FIGS. 2a and 2b provide a practical example of a network environment 250 appropriate to carry out embodiments of the invention. Initially, FIG. 2a provides an environment including a FWA HINT device 202 connected to a RAN node 208 and having a plurality of connections. As shown, device 204a and device 204b are both connected to the FWA HINT device 202. Thus, the FWA HINT device 202 and the connected 204a and 204b devices account for one connection to the node 208 shown as connection A. Meanwhile, device 206a, device 206b, and device 206c are each connected directly to the node 208. Thus, device 206c is connected to the node 208 via connection B; device 206b is connected to the node 208 via connection C; and device 206a is connected to the node 208 via connection D. FIG. 2a, thus, illustrates 4 separate connections to the node 208.

FIG. 2b illustrates benefits of the present invention in an environment 260. Similar to FIG. 1, a FWA HINT device 222 is connected to the node 208 and supports a connection to node 208 for devices 224a and 224b. Further, each of devices 226a, 226b, and 226c are connected to FWA HINT device 222 rather than directly connecting to the node 208. Thus, a single connection, shown as connection E, is provided for each of devices 224a, 224b, 226a, 226b, and 226c.

Figure 3:
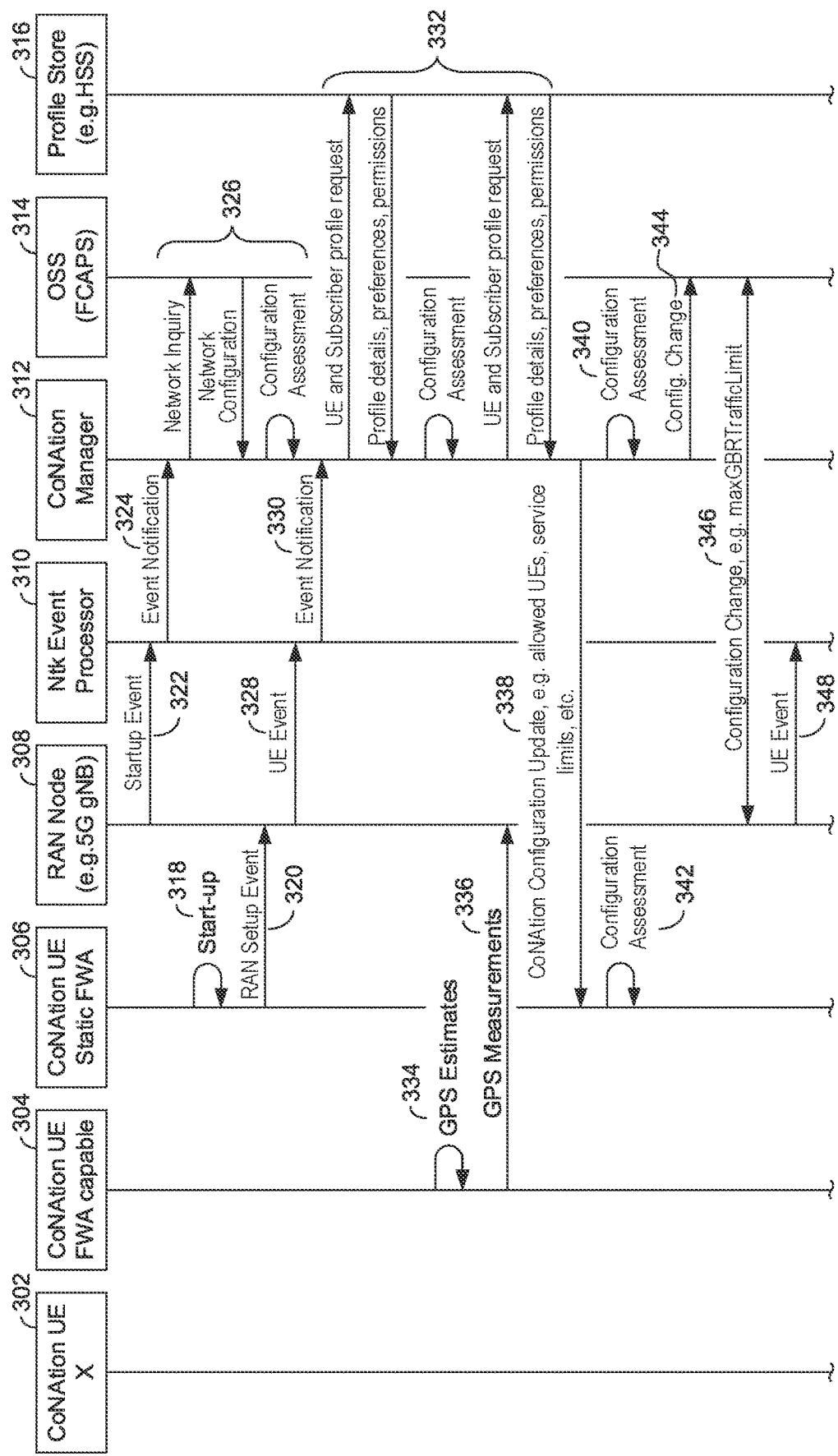
FIG. 3 depicts a diagram of communications for managing network configurations, in accordance with aspects herein.
Figure 3:
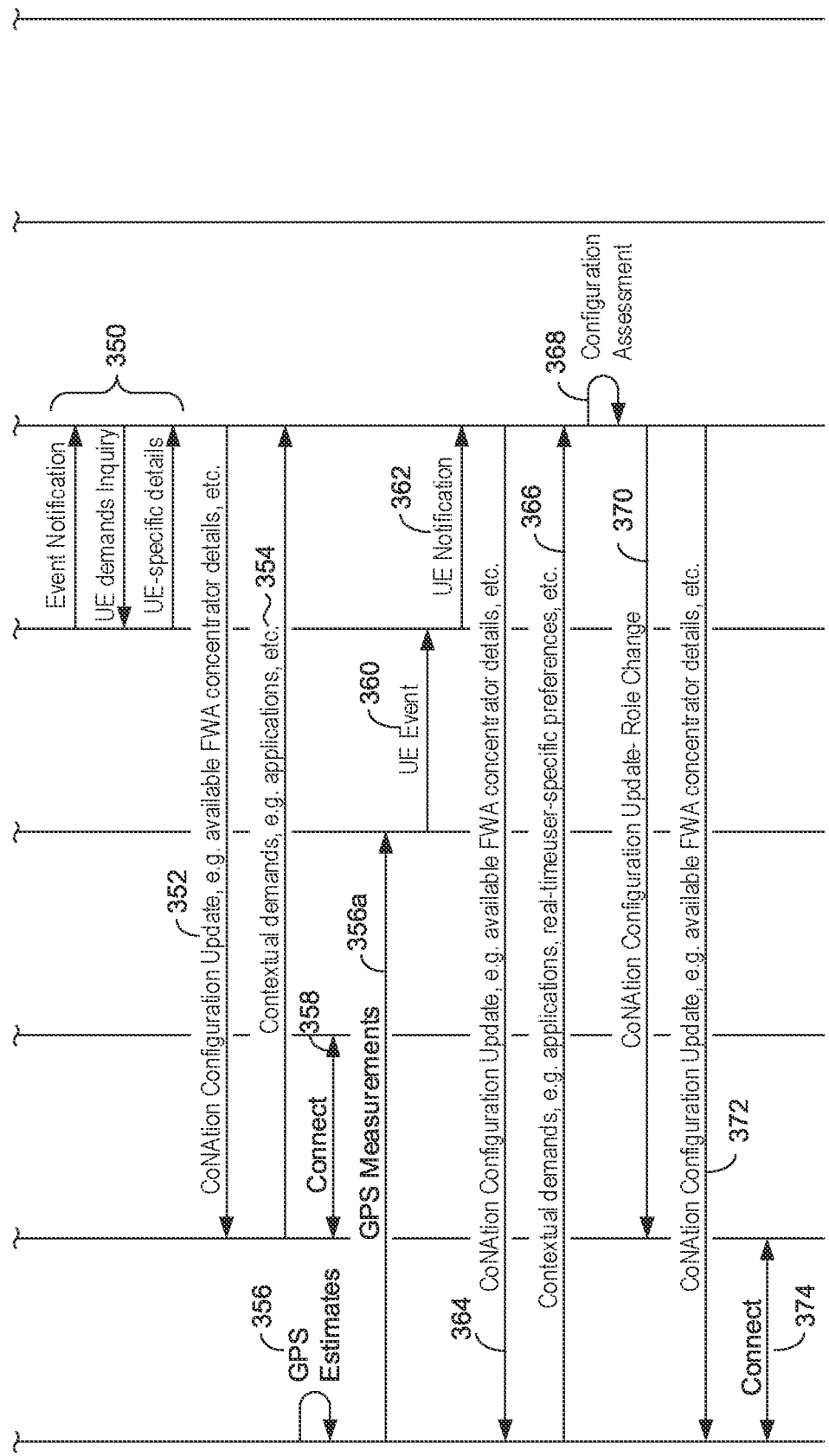

Turning to FIG. 3, a diagram is provided to illustrating management of network configurations. Components carrying out aspects of the method described in FIG. 3 include a CoNAtion UE 302 (a CoNAtion UE is a device that is aware of the aggregation concept but is not FWA-capable), a CoNAtion FWA-capable UE 304 (this UE is aware of the aggregation concept and is FWA-capable), a CoNAtion Static FWA UE 306 (this device is aware of the aggregation concept, is FWA-capable, and is a static device; may be a FWA HINT device), a RAN node 308, a network event processor 310, a CoNAtion manager 312 (shown as manager 110 in FIG. 1), OSS 314, and a Profile store 316.

Initially, a node, such as RAN node 308, needs to connect to a network and, thus, a startup event is initiated at step 322. The network event processor 310 provides an event notification to the manager 312 as it is configured to communicate with both the node 308 and the manager 312. Upon receiving the event notification at step 324, the manager 312 provides a network inquiry to the OSS 314. The OSS 314 replies with network configuration information and a configuration assessment is provided. All of the Manager→OSS communications are illustrated at step 326 for simplicity. These steps are taken each time a node enters the network.

Moving on, the static FWA 306 is now shown as connecting the RAN node 308 by initiating a startup event at step 320. Similarly, the RAN node 308 communicates this event (as it does all events) to the network event processor 310 at step 328. Again, the network event processor 310 is configured to share all RAN node events with manager 312 so the notification is communicated at step 330. The manager 312 queries the profile store 316 for UE information shown at step 332. For example, the manager 312 can query for a UE profile, a user profile, preference information, known permissions, etc.

Looking forward, steps 334 and 336 illustrate CoNAtion FWA-capable UE 304 requesting to enter the network and connecting to the RAN node 308. Upon detecting the new event, the manager 312 can communicate with the RAN node 308 updated configuration information including a maximum number of UEs to be connected, maximum number of UEs to register to the node, service limits, etc. Configuration assessments to obtain the configuration information can be performed periodically, at predetermined time intervals, upon identification of a trigger (e.g., network events), and the like and is shown at steps 340 and 342. Any changes in configuration information can be communication from the manager 312 to the OSS 314 at step 344 and then shared between the manager 312, the OSS 314, and the RAN node 308 at step 346. Configuration information is needed to determine how to configure the network for the entry of device 304. The UE event 348 is detected now that device 304 is entering the network. As with any event, the network event processor 310 communicates an event notification to the CoNAtion manager 312 as well as sharing any other relevant information at step 350. A configuration update is sent at step 352 from the manager 312 to the device 304 and device 304 communicates back any application information or UE demands at step 354. At this point, the manager 312 is determining appropriate network configurations and whether the RAN node 308 can accept another connection or if any FWA-capable devices are present to accept another connection. Here, it is determined that the device 306 can accept another connection so the device 304 connects to the device 306 at step 358.

Meanwhile, device 302 undergoes GPS estimates at step 356. The GPS output is sent from device 302 to the RAN node 308 at step 356a. The UE event (e.g., device 302 attempting to connect to node 308) is communicated from the node 308 to the network event processor 310 at step 360. The network event processor 310, in turn, communicates an event notification to the manager 312 at step 362. As with previous examples, the manager 312 will query the OSS 314 and the profile store 316 to obtain network and UE information. Configuration information is then communicated from the manager 312 to the device 302 at step 364 and the device 302 replies with any UE demands at step 366. The manager 312 performs a configuration assessment at step 368. This configuration assessment comprises evaluating all information known to the manager 312 about the network, the node 308, and any devices connected to the node 308. For example, the manager 312 can identify the current load/traffic at the node 308, how many UEs are registered to the node 308, how many UEs are actively connected to the node 308, and the like. The manager 312 can then evaluate that data in view of any predetermined constraints from the network including a predetermined maximum connection threshold, a maximum registration threshold for the UE registered to the network, any FWA-capable devices on the network, and the like.

In the present example shown in FIG. 3, a configuration update is communicated to device 304 of a role change at step 370. Prior to this communication, device 306 was separately connected to the RAN node 308 and device 304 was connected to device 306, with device 302 attempting to gain access to the node 308 as well. A configuration update is communicated at step 372 to device 302 with instructions on where to connect. Here, it was determined that RAN node 308 will not accept another connection. The connection threshold may meet or exceed the maximum connection threshold for the node 308 or there may be too many registered devices at the node 308, or any other network constraint previously mentioned may be identified by the manager 312. As a result of this configuration, device 302 will connect to device 304 at step 374 since device 304 is a FWA-capable device. In other words, device 304 becomes a FWA hub (i.e., an intermediary) for device 302 to access the node 308.

While FIG. 3 shows the dynamic nature in which new devices can be connected to different FWA hubs/FWA-capable devices, aspects herein also provide for termination of existing connections to redirect a connection from a direct connection with a RAN node to an indirect connection to the RAN node via a FWA hub. Specifically, if device 1 and device 2 are both connected to a RAN node and then device 3 attempts to connect the manager will determine network configurations. Assume that device 1 is FWA-capable, device 2 is not FWA-capable, and device 3 is FWA-capable. In that instance, the manager may determine that a direct connection between the RAN node and device 3 is a higher priority than a direct connection with device 2. As such, the direct connection between device 2 and the RAN node may be terminated, a new connection established between the RAN node and device 3, and device 2 could be re-connected to the RAN node (indirectly) via a FWA hub that could be either device 1 or device 3. In the event that device 1 becomes the FWA hub for device 2, a role change configuration update would be communicated from the manager to device 1 and configuration details instructing a connection to device 1 would be communicated to device 2. In the event that device 3 should be the FWA hub, configuration details, including the role of FWA hub when connecting to the RAN node would be communicated from the manager to device 3, device 1 would remain unchanged, and device 2 would receive instructions to connect to device 3 as the FWA hub.

In the above description, references are made to communicating configuration details to devices. FWA-capable devices can be equipped with agents that are configured to communicate with (e.g., send messages to and receive messages from) the manager. Thus, in any instant described herein where configuration information/instructions is sent to devices, it should be noted that the receipt and execution of said instructions is performed by one or more agents associated with the device as illustrated in FIG. 1.

Additionally, in some aspects, a device may be prompted for permission to be re-assigned as a FWA hub. A notification may be provided to a device asking a user for permission to allow one or more other devices to connect to a network using their device as a FWA hub. In some embodiments, once a user approves a device to use their device as an intermediary, the user will not need to approve that particular device again in the future (i.e., the manager/agents can remember approved devices such that permission requests are not duplicative). Alternatively, a user may opt to be asked every time for every user and not remember permissions. This is a configurable setting by the user, network provide, or combinations thereof.

Furthermore, the present invention has utility beyond a residential setting. Imagine a stadium with thousands of UEs (or any setting with a large number of UEs present) where each UE is seeking network access. Aspects herein can limit the number of connections to the node by utilizing CoNAtion aware devices that are fixed wireless access-capable. This decreases congestion at the network node.

Figure 4:
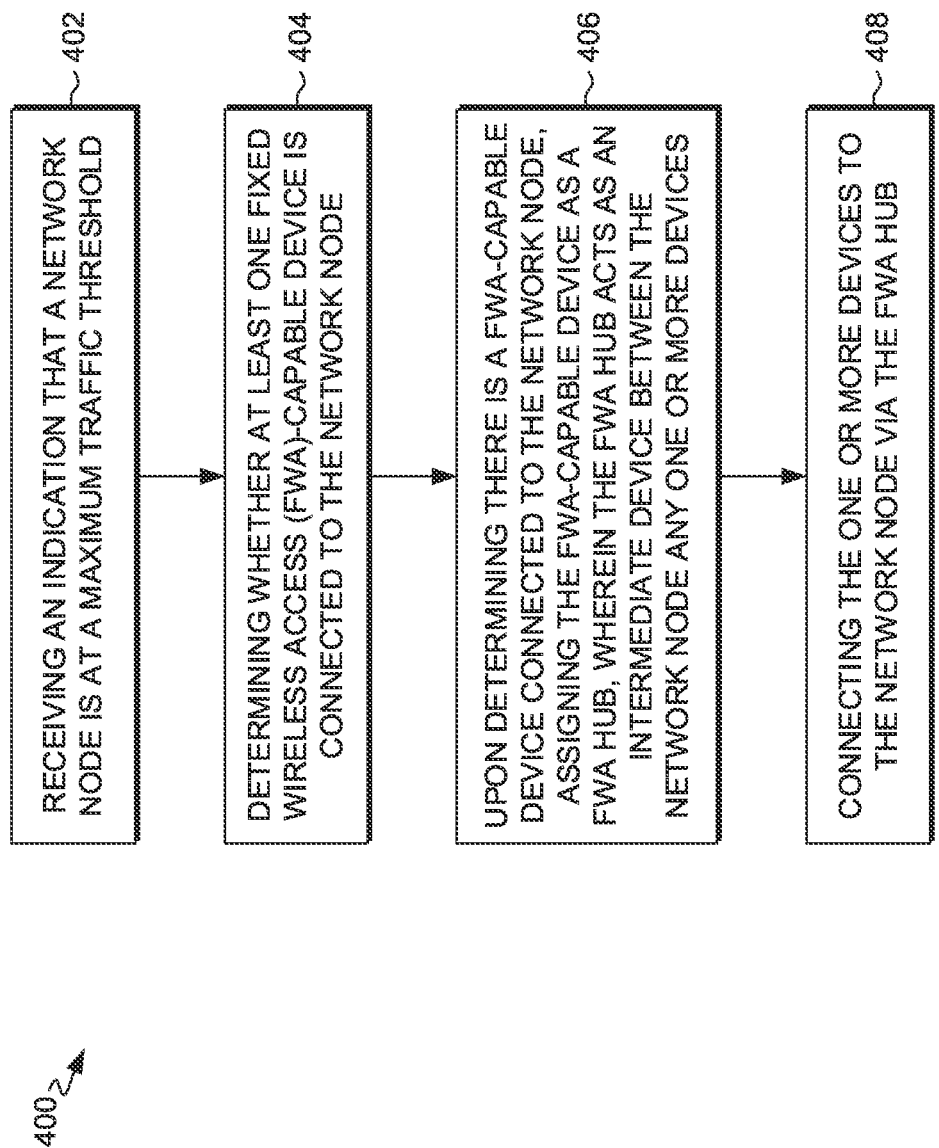
FIG. 4 depicts a flow diagram of a method for managing network configurations, in accordance with aspects herein.

Referring to FIG. 4, a flow diagram 400 is provided illustrating a flow to manage network configurations. Initially, at block 402, an indication is received that a network node is at a maximum traffic threshold. A maximum traffic threshold can be a network constraint identifying a number of connections accepted, a number of registered devices, etc. One of skill in the art will recognize that traffic is a known network constraint and measurable parameter. At block 404, a determination is made whether at least one fixed wireless access (FWA)-capable device is connected to the network node. Upon determining there is a FWA-capable device connected to the network node, an assignment is made of the FWA-capable device as a FWA hub at block 406. The FWA hub acts as an intermediate device between the network node any one or more devices. At block 408, the one or more devices are connected to the network node via the FWA hub.

Figure 5:
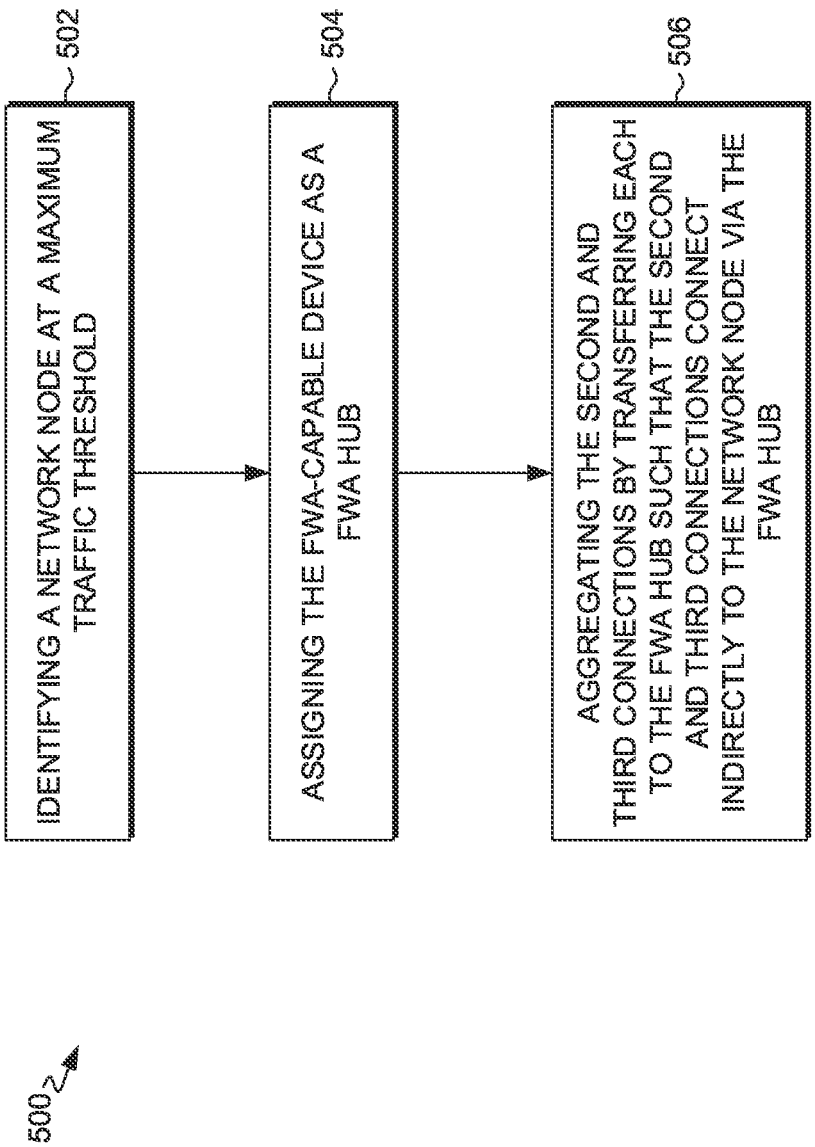
FIG. 5 depicts a flow diagram of a method for managing network configurations, in accordance with aspects herein.

In FIG. 5, a flow diagram 500 is provided depicting a flow to manage network configurations. At block 502, a network node is identified at a maximum traffic threshold, wherein the network node is managing a first connection with a fixed wireless access (FWA)-capable device, a second connection with a non-FWA-capable device, and a third connection with a non-FWA-capable device. At block 504, the FWA-capable device is assigned to be a FWA hub. At block 506, the second and third connections are aggregated by transferring each to the FWA hub such that the second and third connections connect indirectly to the network node via the FWA hub, wherein the network node maintains a first connection with the FWA hub, and wherein the second and third connections were terminated from a direct connection with the network node.

Referring to FIG. 6, a block diagram of an exemplary computing device 600 suitable for use in implementations of the technology described herein is provided. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. It should be noted that although some components in FIG. 6 are shown in the singular, they may be plural. For example, the computing device 600 might include multiple processors or multiple radios. In aspects, the computing device 600 may be a UE/WCD, or other user device, capable of two-way wireless communications with an access point. Some non-limiting examples of the computing device 600 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 6, computing device 600 includes a bus 610 that directly or indirectly couples various components together, including memory 612, processor(s) 614, presentation component(s) 616 (if applicable), radio(s) 624, input/output (I/O) port(s) 618, input/output (I/O) component(s) 620, and power supply(s) 622. Although the components of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 612 may take the form of memory components described herein. Thus, further elaboration will not be provided here, but it should be noted that memory 612 may include any type of tangible medium that is capable of storing information, such as a database. A database may be any collection of records, data, and/or information. In one embodiment, memory 612 may include a set of embodied computer-executable instructions that, when executed, facilitate various functions or elements disclosed herein. These embodied instructions will variously be referred to as "instructions" or an "application" for short.

Processor 614 may actually be multiple processors that receive instructions and process them accordingly. Presentation component 616 may include a display, a speaker, and/or other components that may present information (e.g., a display, a screen, a lamp (LED), a graphical user interface (GUI), and/or even lighted keyboards) through visual, auditory, and/or other tactile cues.

Radio 624 represents a radio that facilitates communication with a wireless telecommunications network. Illustrative wireless telecommunications technologies include CDMA, GPRS, TDMA, GSM, and the like. Radio 624 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 618 may take a variety of forms. Exemplary I/O ports may include a USB jack, a stereo jack, an infrared port, a firewire port, other proprietary communications ports, and the like. Input/output (I/O) components 620 may comprise keyboards, microphones, speakers, touchscreens, and/or any other item usable to directly or indirectly input data into the computing device 600.

Power supply 622 may include batteries, fuel cells, and/or any other component that may act as a power source to supply power to the computing device 600 or to other network components, including through one or more electrical connections or couplings. Power supply 622 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for managing network configurations, the system comprising:
   one or more hardware processors; and
   one or more non-transitory computer-readable media storing computer-usable instructions that, when executed by the one or more hardware processors, cause the one or more hardware processors to:
   at a network manager associated with a base station:
      receive an indication that the base station is at a maximum traffic threshold, wherein the maximum traffic threshold indicates a number of devices connected to the base station;
      determine whether at least one fixed wireless access (FWA)-capable device is connected to the base station;
      upon determining there is at least one FWA-capable device connected to the base station, assign the FWA-capable device as a FWA hub, wherein the FWA hub acts as an intermediate device between the base station and one or more devices; and
      connect the one or more devices indirectly to the base station via the FWA hub.

2. The system of claim 1, wherein the FWA-capable device is a static device.

3. The system of claim 1, wherein the FWA-capable device is a mobile device.

4. The system of claim 1, wherein the one or more hardware processors is further configured to identify a number of connections at the network node to determine whether the network node is at a predetermined connection threshold.

5. The system of claim 4, wherein the one or more hardware processors is further configured to terminate any existing connections to the network node that exceed a predetermined connection threshold.

6. The system of claim 1, wherein the one or more hardware processors is further configured to prompt the FWA-capable device for permission to reconfigure the FWA-capable device as the FWA hub.

7. The system of claim 1, wherein assigning the FWA-capable device as a FWA hub includes communicating reconfiguration details to the FWA-capable device.

8. A method for managing network configurations, the method comprising:
   at a network manager associated with a base station:
      receiving an indication that the base station is at a maximum traffic threshold;
      determining whether at least one fixed wireless access (FWA)-capable device is connected to the base station;
      upon determining there is a FWA-capable device connected to the base station, assigning the FWA-capable device as a FWA hub, wherein the FWA hub acts as an intermediate device between the base station and one or more devices;
      terminating one or more direct connections between the one or more devices and the base station; and
      connecting the one or more devices indirectly to the base station via the FWA hub.

9. The method of claim 8, wherein the FWA-capable device is a mobile device.

10. The method of claim 8, further comprising identifying a number of connections at the base station to determine whether the base station is at a predetermined connection threshold.

11. The method of claim 8, further comprising terminating any existing connections to the base station that exceed a predetermined connection threshold.

12. The method of claim 11, further comprising reconnecting the existing connections that were terminated to the base station via the FWA hub.

13. The method of claim 8, further comprising prompting the FWA-capable device for permission to reconfigure the FWA-capable device as the FWA hub.

14. The method of claim 8, wherein assigning the FWA-capable device as a FWA hub includes communicating reconfiguration details to the FWA-capable device.

15. A method for managing network configurations, the method comprising:
   at a network manager associated with a network node:
      identifying the network node at a maximum traffic threshold, wherein the network node is managing a first connection with a fixed wireless access (FWA)-capable device, a second connection with a non-FWA-capable device, and a third connection with a non-FWA-capable device;
      assigning the FWA-capable device as a FWA hub; and
      aggregating the second and third connections by transferring each to the FWA hub such that the second and third connections connect indirectly to the network node via the FWA hub, wherein the network node maintains a first connection with the FWA hub, and wherein the second and third connections were terminated from a direct connection with the network node.

16. The method of claim 15, wherein the FWA-capable device is a mobile device.

17. The method of claim 15, wherein the non-FWA-capable device is a mobile device.

18. The method of claim 15, further comprising prompting the FWA-capable device for permission to reconfigure the FWA-capable device as the FWA hub and allow the second connection and the third connection to connect to the FWA-capable device as the FWA hub.

19. The method of claim 15, further comprising communicating reconfiguration instructions to the FWA-capable device.

20. The method of claim 15, further comprising communicating a reconnection instruction to each of the devices associated with the second connection and the third connection.

* * * * *